United States Patent
Sayo

(10) Patent No.: US 10,784,667 B2
(45) Date of Patent: Sep. 22, 2020

(54) LAMINATED FLAT ELECTRIC WIRE

(71) Applicant: TOYOTA JIDOSHA KABUSHIKI KAISHA, Toyota-shi (JP)

(72) Inventor: Takashi Sayo, Kasugai (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 16/195,106

(22) Filed: Nov. 19, 2018

(65) Prior Publication Data
US 2019/0173270 A1 Jun. 6, 2019

(30) Foreign Application Priority Data

Dec. 1, 2017 (JP) .................................. 2017-231781

(51) Int. Cl.
*H02G 5/00* (2006.01)
*H01R 11/12* (2006.01)
*B60R 16/02* (2006.01)

(52) U.S. Cl.
CPC ............. *H02G 5/005* (2013.01); *H01R 11/12* (2013.01); *B60R 16/0207* (2013.01)

(58) Field of Classification Search
CPC ........ H02G 5/005; H01R 11/12; H01R 4/182; B60R 16/0207
See application file for complete search history.

(56) References Cited

U.S. PATENT DOCUMENTS

| | | | | |
|---|---|---|---|---|
| 2,912,603 A | * | 11/1959 | Farnsworth | H02G 5/06 174/88 B |
| 3,104,276 A | * | 9/1963 | Cataldo | H02G 5/007 174/88 B |
| 3,264,403 A | * | 8/1966 | Erdle | H02G 5/005 174/117 FF |
| 3,346,687 A | * | 10/1967 | Giger, Jr. | H02G 5/06 174/68.2 |
| 3,466,745 A | * | 9/1969 | Stopp | H01B 7/00 29/825 |

(Continued)

FOREIGN PATENT DOCUMENTS

| | | |
|---|---|---|
| CN | 102057522 A | 5/2011 |
| CN | 106663676 A | 5/2017 |

(Continued)

*Primary Examiner* — William H. Mayo, III
*Assistant Examiner* — Rhadames Alonzo Miller
(74) *Attorney, Agent, or Firm* — Oblon, McClelland, Maier & Neustadt, L.L.P.

(57) ABSTRACT

A laminated flat electric wire includes four or more rectangular plate-shaped flat electric wires. The flat electric wires are laminated, and each of the flat electric wires has tabs extending from each of the flat electric wires, one tab being provided at each of a first end portion and a second end portion. In a plan view as viewed in a direction along a lamination direction of the flat electric wires, the tabs of the respective flat electric wires are provided so as not to overlap each other at each of the first end portion and the second end portion, and the flat electric wire having the tab provided outermost along a width direction of the flat electric wire, among the respective tabs provided at the first end portions, has, at the second end portion, the tab provided at a position interposed between the tabs of other flat electric wires.

6 Claims, 9 Drawing Sheets

(56) References Cited

U.S. PATENT DOCUMENTS

| | | | | | |
|---|---|---|---|---|---|
| 3,476,871 | A * | 11/1969 | Erdle | ............... | H02G 5/005 174/117 FF |
| 4,009,920 | A * | 3/1977 | Hicks, Jr. | ............... | H02G 5/007 174/88 B |
| 4,225,205 | A * | 9/1980 | Sinclair | ............... | H01R 23/66 439/467 |
| 4,382,156 | A * | 5/1983 | Jodoin | ............... | H02G 5/005 174/72 B |
| 4,794,691 | A * | 1/1989 | Brandeau | ............... | H01R 12/69 29/861 |
| 4,834,673 | A * | 5/1989 | Beinhaur | ............... | H01R 12/675 439/422 |
| 4,886,940 | A * | 12/1989 | Gagnon | ............... | H01R 25/162 174/88 B |
| 5,620,338 | A * | 4/1997 | Stephens | ............... | H01R 11/281 439/522 |
| 6,203,343 | B1 * | 3/2001 | Chevassus-More | ............... | B60R 16/0207 174/72 B |
| 6,344,613 | B1 * | 2/2002 | Kolodziej | ............... | B60R 16/0207 174/254 |
| 6,674,006 | B1 * | 1/2004 | Linehan | ............... | H01R 31/085 174/149 B |
| 7,595,445 | B2 * | 9/2009 | Legendre | ............... | H01R 25/162 174/27 |
| 7,704,104 | B2 * | 4/2010 | Duley | ............... | H01R 11/12 439/756 |
| 8,436,244 | B2 * | 5/2013 | Takahashi | ............... | H02M 7/003 174/68.2 |
| 9,419,321 | B2 * | 8/2016 | Vaccaro | ............... | H01P 3/06 |
| 2003/0019658 | A1 * | 1/2003 | Adams | ............... | H01B 7/0838 174/117 F |
| 2003/0096520 | A1 * | 5/2003 | Wolford | ............... | H01R 12/585 439/110 |
| 2006/0240710 | A1 * | 10/2006 | Kato | ............... | H01R 13/5205 439/587 |
| 2010/0212934 | A1 * | 8/2010 | Sexton | ............... | H01B 7/0216 174/113 R |
| 2011/0120747 | A1 * | 5/2011 | Muneyasu | ............... | B60R 16/0207 174/113 R |
| 2012/0097447 | A1 * | 4/2012 | Muraki | ............... | H01R 4/70 174/885 |
| 2015/0008012 | A1 * | 1/2015 | Sasaki | ............... | H01P 3/085 174/117 F |
| 2015/0042421 | A1 * | 2/2015 | Kato | ............... | H01P 3/085 333/238 |
| 2015/0255192 | A1 * | 9/2015 | Ogawa | ............... | H01B 7/0241 174/74 R |
| 2015/0325937 | A1 * | 11/2015 | Mikage | ............... | H05K 3/321 439/493 |
| 2018/0174716 | A1 * | 6/2018 | Kominato | ............... | H01R 11/288 |

FOREIGN PATENT DOCUMENTS

| | | |
|---|---|---|
| JP | 2017-136926 | 8/2017 |
| JP | 2018-101600 | 6/2018 |

* cited by examiner

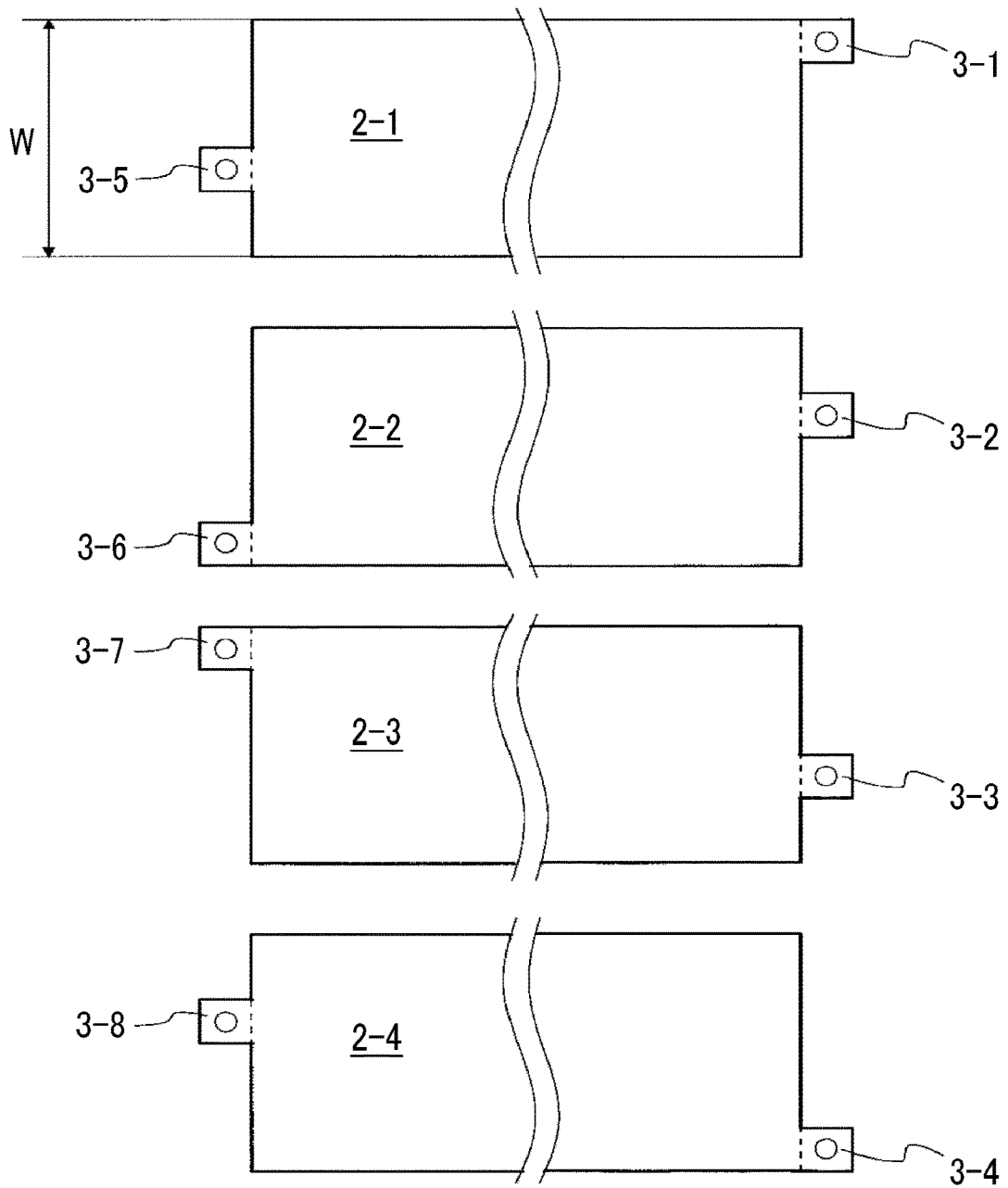
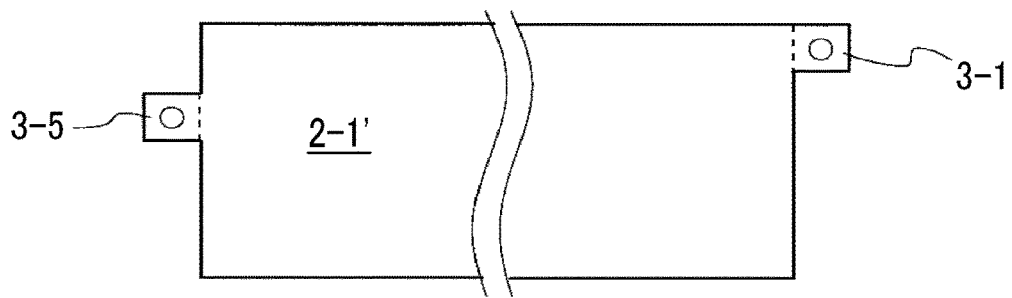

US 10,784,667 B2

LAMINATED FLAT ELECTRIC WIRE

INCORPORATION BY REFERENCE

The disclosure of Japanese Patent Application No. 2017-231781 filed on Dec. 1, 2017 including the specification, drawings and abstract is incorporated herein by reference in its entirety.

BACKGROUND

1. Technical Field

The disclosure relates to a laminated flat electric wire that is mounted on a vehicle or the like.

2. Description of Related Art

In a vehicle, a plurality of various electric wires for electric power supply from a battery or an alternator to various electrical components or for signal transmission between the electrical components is mounted. Various trunk line structures and branch structures for simplifying a mounting structure of electric wires in a vehicle is disclosed (Japanese Unexamined Patent Application Publication No. 2017-136926 (JP 2017-136926 A)).

As an electric wire that is used for a vehicle or the like, a laminated flat electric wire in which a plurality of band-shaped flat electric wires is laminated in a state of being insulated from each other is disclosed. An example of the laminated flat electric wire as described above is shown in FIG. 7A to FIG. 7C. FIG. 7A shows a perspective view of a laminated flat electric wire 901. FIG. 7B shows an exploded perspective view of the laminated flat electric wire 901. FIG. 7C shows a plan view of the laminated flat electric wire 901. The laminated flat electric wire 901 includes four flat electric wires 902 (902-1 to 902-4), as an example. The respective flat electric wires have insulating layers and are laminated in a state of being insulated from each other. It is conceivable that tabs 903 (903-1 to 903-8) extending so as not to overlap each other when viewed in a lamination direction are provided at end edges in an extending direction in the respective flat electric wires 902 in order to provide input/output terminals for an electric current. Each of the tabs 903 has, for example, a hole through which a fixing bolt passes, and an insulating layer is not formed thereon in order to provide electric conductivity.

SUMMARY

In the laminated flat electric wire as described above, it is desired to suppress variation in electric resistance in order to equalize the electric characteristics of the respective flat electric wires. However, sufficient consideration has not been given to the influence of disposition of the tabs of the flat wire.

The disclosure provides a laminated flat electric wire in which variation in electric resistance of a plurality of flat electric wires is suppressed.

An aspect of the disclosure relates to a laminated flat electric wire including four or more rectangular plate-shaped flat electric wires. The flat electric wires are laminated, and each of the flat electric wires has tabs extending from each of the flat electric wires, one tab being provided at each of a first end portion and a second end portion that are two end portions in an extending direction. In a plan view as viewed in a direction along a lamination direction of the flat electric wires, the tabs of the respective flat electric wires are provided so as not to overlap each other at each of the first end portion and the second end portion, and the flat electric wire having the tab provided outermost along a width direction of the flat electric wire, among the respective tabs provided at the first end portions, has, at the second end portion, the tab provided at a position interposed between the tabs of other flat electric wires.

According to the aspect of the disclosure, a pattern in which both the tabs are disposed outermost at both end portions in the flat electric wire, and thus electrical resistance between the tabs becomes relatively large, is avoided, and thus it is possible to suppress variation in electric resistance.

In the laminated flat electric wire according to the aspect of the disclosure, at least two of the four or more flat electric wires to be laminated may have planar shapes congruent with each other.

According to the aspect of the disclosure, it is possible to reduce types of parts of the laminated flat electric wire and reduce a manufacturing cost.

In the laminated flat electric wire according to the aspect of the disclosure, the tab at the second end portion may be provided within a range of a distance from a half to three quarters of a width in the width direction of the flat electric wire from a corner on the diagonal side of a corner where the tab is formed at the first end portion.

According to the aspect of the disclosure, it is possible to provide a laminated flat electric wire in which variation in electric resistance is suppressed by avoiding tab disposition in which electric resistance becomes relatively large in a plurality of flat electric wires.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 4A is a plan view of a flat electric wire configuring the laminated flat wire according to the embodiment of the disclosure;

FIG. 4B is a plan view of a flat electric wire configuring the laminated flat wire according to the embodiment of the disclosure;

DETAILED DESCRIPTION OF EMBODIMENTS

Overview

A laminated flat electric wire according to an embodiment of the disclosure is configured by laminating rectangular plate-shaped flat electric wires. The flat electric wire has tabs for connection at both end portions. The tabs of the respective flat electric wires are provided at positions that do not overlap each other in a plan view as viewed in a direction along a lamination direction of the flat electric wires. In any flat electric wire, two tabs are provided such that at least one of the tabs is not disposed outermost along a width direction of the flat electric wire. That is, in a case where the flat electric wire has a tab at the outermost side at one end portion thereof, the flat electric wire has, at the other end portion thereof, a tab provided at a position interposed between tabs of other flat electric wires. Due to the above, the laminated flat electric wire does not include a flat electric wire having tab disposition in which electric resistance between tabs, as described later, becomes the largest, and thus it is possible to suppress variation in electric resistance of each flat electric wire.

Regarding Electric Resistance Characteristic of Flat Electric Wire

Figure 1A:
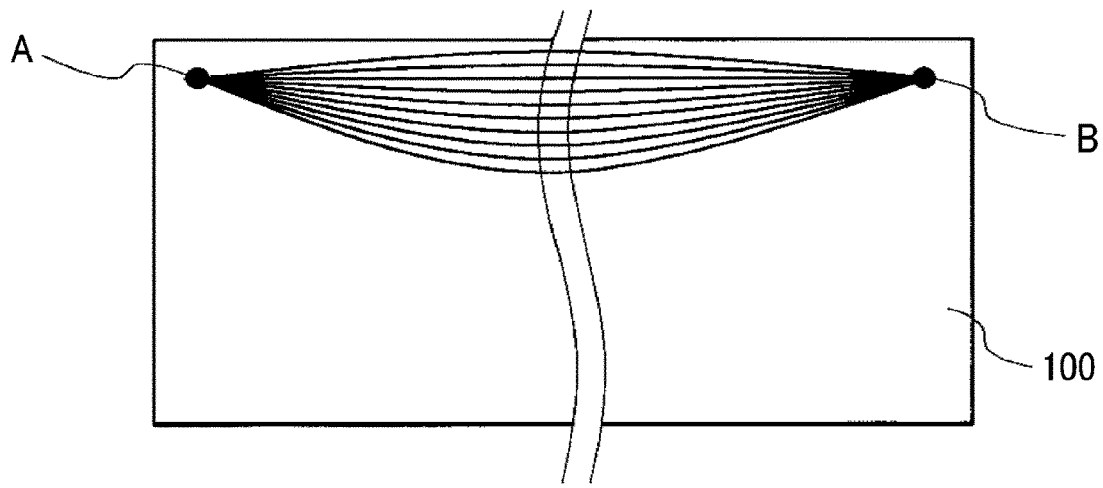
FIG. 1A is a plan view showing a current path in a rectangular electric conductor.
Figure 1B:
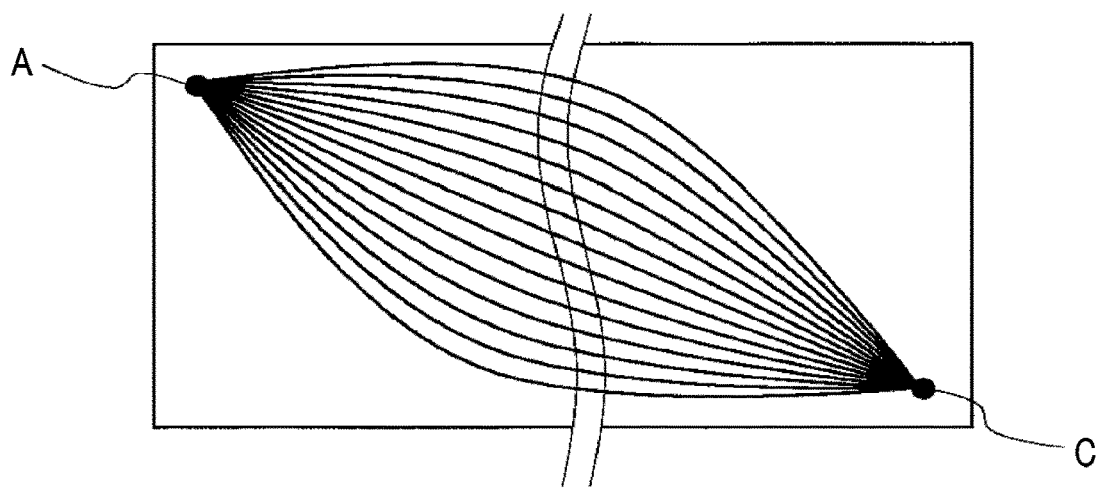
FIG. 1B is a plan view showing a current path in the rectangular electric conductor.
Figure 1C:
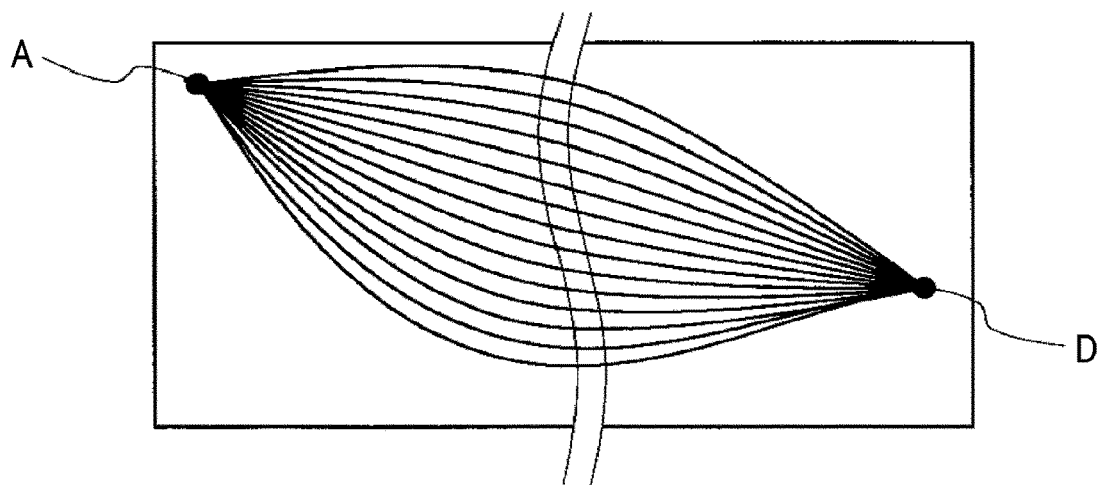
FIG. 1C is a plan view showing a current path in the rectangular electric conductor.

In general, in a rectangular plate-shaped electric conductor, electric resistance between one point on a first end edge and one point on a second end edge varies according to the position of each point. FIG. 1A to FIG. 1C schematically show current paths in an electric conductor 100. FIG. 1A shows a current path between a point A provided at one corner of the electric conductor 100 and a point B provided at a corner that is at an opposed position. FIG. 1B shows a current path between the point A and a point C provided at a corner that is at a diagonal position. FIG. 1C shows a current path between the point A and a point D between the point B and the point C. In the example shown in FIG. 1A, since the current path is biased toward a region near an upper side, the electric resistance becomes relatively large. In the example shown in FIG. 1B, since an electric current flows substantially along a diagonal line, so that the length of the current path becomes the longest, the electric resistance becomes relatively large. In contrast, in the example shown in FIG. 1C, since the current path is present over a wider region than in the example shown in FIG. 1A and the length of the current path is shorter than that in the example shown in FIG. 1B, the electric resistance becomes smaller than in the examples shown in FIG. 1A and FIG. 1B.

Figure 2A:
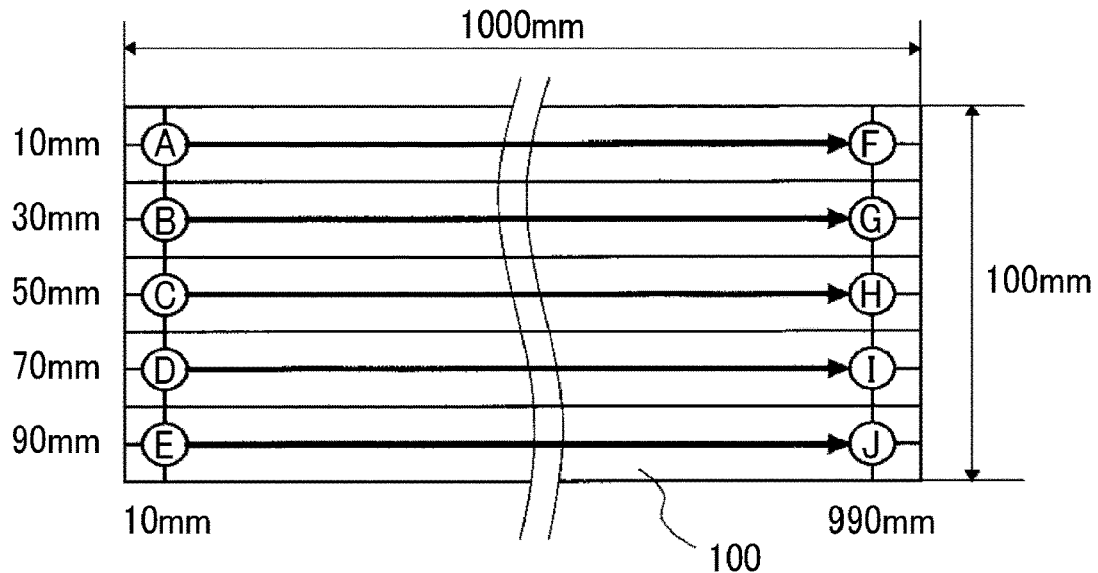
FIG. 2A is a plan view showing how to take two points for measuring electric resistance of the rectangular electric conductor.
Figure 2B:
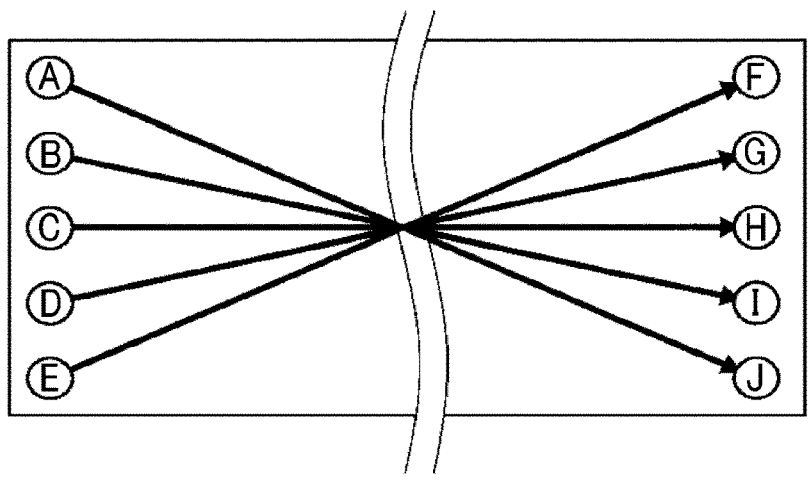
FIG. 2B is a plan view showing how to take two points for measuring electric resistance of the rectangular electric conductor.
Figure 2C:
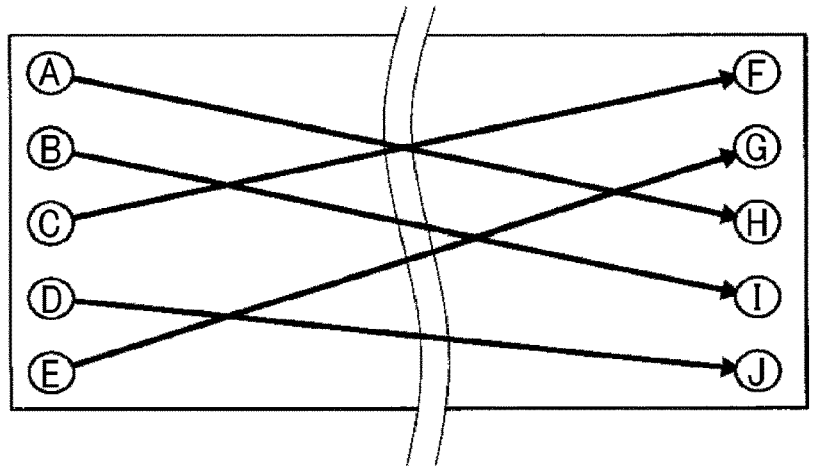
FIG. 2C is a plan view showing how to take two points for measuring electric resistance of the rectangular electric conductor.

As shown in FIG. 2A to FIG. 2C, as the electric conductor 100, a rectangular plate-shaped electric conductor in which the length of each of two opposite short sides is 100 mm and the length of each of two long sides orthogonal to two side sides is 1000 mm is prepared. Points A, B, C, D, E were taken at the positions of the distance of 10 mm from one short side (the left) toward the other short side (the right) and the respective distances of 10 mm, 30 mm, 50 mm, 70 mm, and 90 mm from one long side (the top) toward the other long side (the bottom). Points F, G; H, I, J were taken at the positions of the distance of 10 mm from the other short side toward one short side and the respective distances of 10 mm, 30 mm, 50 mm, 70 mm, and 90 mm from one long side toward the other long side. One point among the points A, B, C, D, E and one point among the points F, G, H, I, J were selected and the combination of electric resistance between the selected two points was measured.

Measurement 1

As shown in FIG. 2A, the electric resistance between two points, that is, the points A-F, the points B-G; the points C-H, the points D-I, and the points E-J, was measured. The electric resistance between the points C-H that are at the center in the width direction was the smallest, and the region of the current path became narrower as two points were located toward the same long side, and thus the electric resistance became large. The minimum value of the electric resistance value was 0.621 mΩ, the maximum value was 0.685 mΩ, and the difference between the maximum value and the minimum value of the electric resistance value was 0.064 mΩ.

Measurement 2

As shown in FIG. 2B, the electric resistance between two points, that is, the points A-J, the points B-I, the points C-H, the points D-G and the points E-F, was measured. The electric resistance between the points C-H that are at the center in the width direction was the smallest, and the current path became longer as two points were respectively located toward one long side and the other long side, and thus the electric resistance became large. The minimum value of the electric resistance value was 0.621 mΩ, the maximum value was 0.692 mΩ, and the difference between the maximum value and the minimum value of the electric resistance value was 0.071 mΩ.

Measurement 3

As shown in FIG. 2C, the electric resistance between two points, that is, the points A-H, the points B-I, the points C-F, the points D-J, and the points E-G, was measured. Due to disposition made such that at least one point out of the two points is not located outermost along the short side, the distance between the two points and the area of the region of the current path were equalized more than those in the cases of Measurements 1, 2. The minimum value of the electric resistance value was 0.641 mΩ, the maximum value was 0.665 mΩ, and the difference between the maximum value and the minimum value of the electric resistance value was 0.024 mΩ.

From the above, it is found that in a rectangular flat electric wire, in a group of sets of two points that is set of one point selected from a plurality of points in the vicinity of one short side and the other point selected from a plurality of points in the vicinity of the opposite short side, the set of the points that are located outermost at each short side is not adopted as an element, whereby it is possible to reduce variation in electric resistance value between the two points of each set belonging to the group.

Embodiment

An embodiment of the disclosure is configured based on the above. Hereinafter, this embodiment will be described in detail with reference to the drawings.

Configuration

Figure 3A:
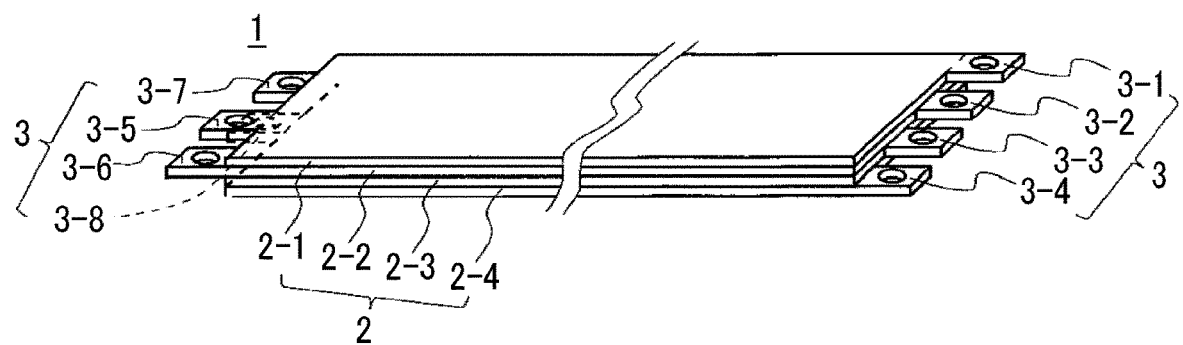
FIG. 3A is a perspective view of a laminated flat wire according to an embodiment of the disclosure.
Figure 3B:
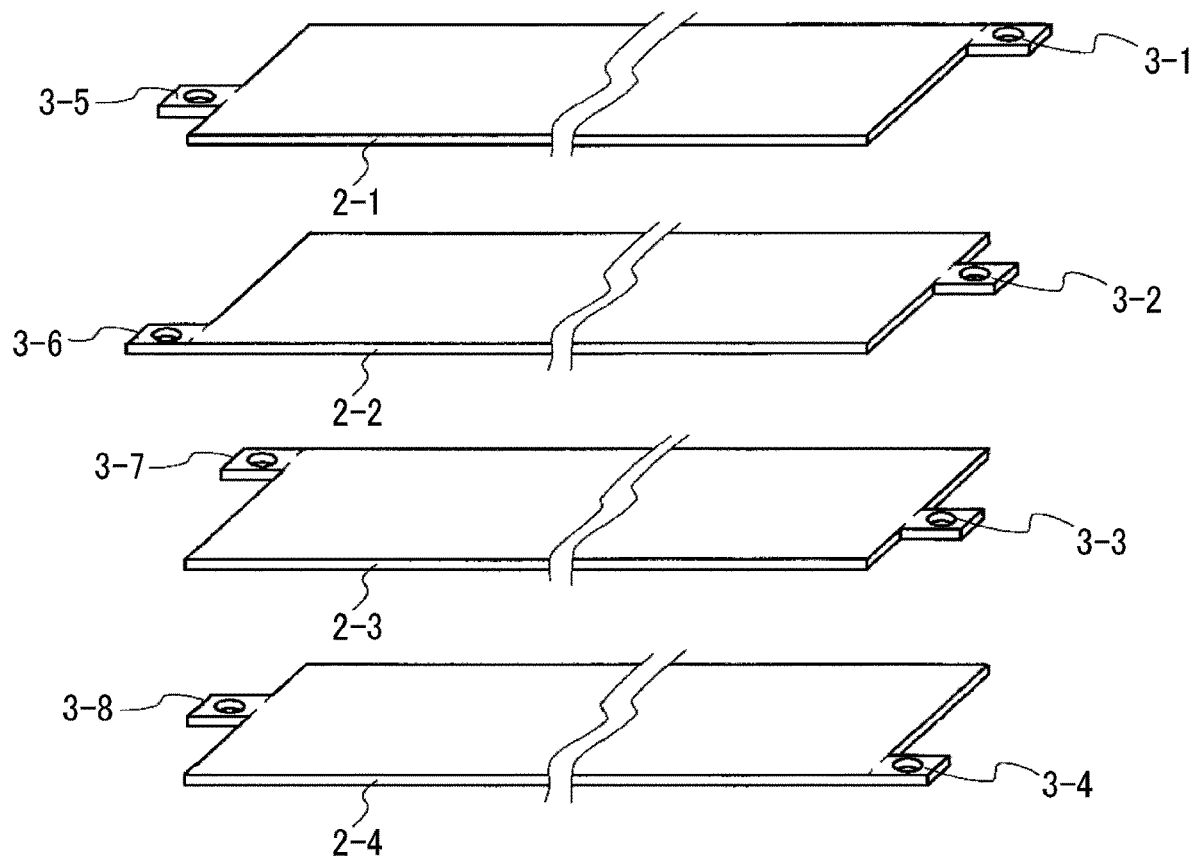
FIG. 3B is an exploded perspective view of the laminated flat wire according to the embodiment of the disclosure.
Figure 3C:
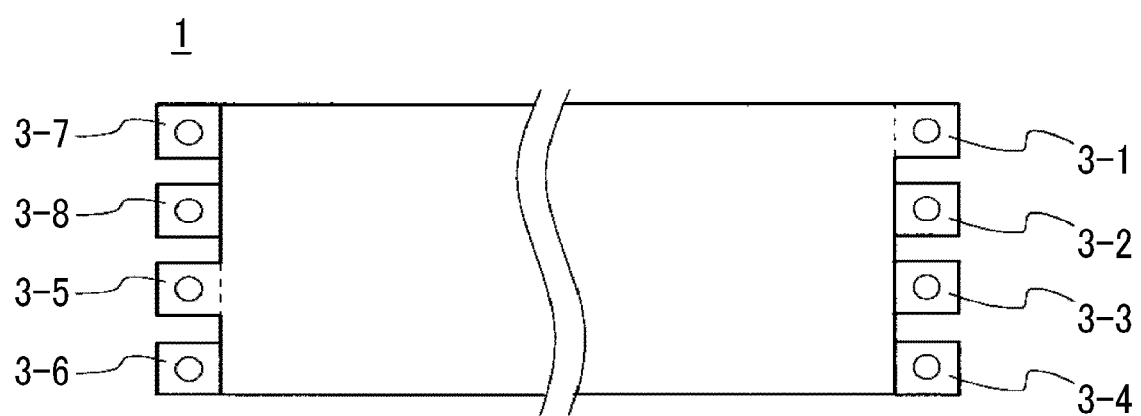
FIG. 3C is a plan view of the laminated flat wire according to the embodiment of the disclosure.

FIG. 3A shows a perspective view of a laminated flat electric wire 1 according to this embodiment. FIG. 3B shows an exploded perspective view of the laminated flat electric wire 1. FIG. 3C shows a plan view of the laminated flat electric wire 1 as viewed in the direction along the lamination direction. The laminated flat electric wire 1 includes four rectangular flat electric wires 2 (2-1 to 2-4), as an example. The respective flat electric wires 2 have insulating layers and are laminated in a state of being insulated from each other. The respective flat electric wires 2 include tabs 3 (3-1 to 3-4) extending from a first end portion in an extending direction. The respective flat electric wires 2 include tabs 3 (3-5 to 3-8) extending from a second end portion in the extending direction. Each of the tabs 3 has, for example, a hole, and an insulating layer is not formed on the tab 3. The tab 3 as described above is provided as an input terminal or an output terminal of each flat electric wire 2 so as to become a connection portion with another electric wire or another conductive member such as a branch box. It is desired that an insulating layer is not formed on the surface of each tab 3 in order to maintain electrical conductivity. Plating treatment may be performed in order to improve electrical conductivity. However, when a hole is provided in each tab 3, the inner peripheral surface of each hole is not insulated, and sufficient conduction can be made by the contact between the inner peripheral surface and another conductive member, an insulating layer may be provided on the surface of the tab 3. The respective tabs are provided at positions that do not overlap each other when viewed in the lamination direction of the laminated flat electric wire 1, in order to facilitate the connection with other conductive members. The laminated flat electric wire 1 may be further covered with resin or the like and may be provided with other accessories.

FIG. 4A shows plan views of the flat electric wires 2-1 to 2-4. Among the tabs 3-1 to 3-4 on the first end portion side, the tab 3-1 on the first end portion side of the flat electric wire 2-1 is located outermost along the width direction of the laminated flat electric wire 1. In contrast, among the tabs 3-5 to 3-8 on the second end portion side, the tab 3-5 on the second end portion side of the flat electric wire 2-1 is not located outermost along the width direction of the laminated flat electric wire 1.

Among the tabs 3-5 to 3-8 on the second end portion side, the tab 3-6 on the second end portion side of the flat electric wire 2-2 is located outermost along the width direction of the laminated flat electric wire 1. In contrast, among the tabs 3-1 to 3-4 on the first end portion side, the tab 3-2 on the first end portion side of the flat electric wire 2-2 is not located outermost along the width direction of the laminated flat electric wire 1.

Among the tabs 3-5 to 3-8 on the second end portion side, the tab 3-7 on the second end portion side of the flat electric wire 2-3 is located outermost along the width direction of the laminated flat electric wire 1. In contrast, among the tabs 3-1 to 3-4 on the first end portion side, the tab 3-3 on the first end portion side of the flat electric wire 2-3 is not located outermost along the width direction of the laminated flat electric wire 1.

Among the tabs 3-1 to 3-4 on the first end portion side, the tab 3-4 on the first end portion side of the flat electric wire 2-4 is located outermost along the width direction of the laminated flat electric wire 1. In contrast, among the tabs 3-5 to 3-8 on the second end portion side, the tab 3-8 on the second end portion side of the flat electric wire 2-4 is not located outermost along the width direction of the laminated flat electric wire 1.

As described above, in a case where the flat electric wire 2 has the tab 3 provided outermost in the width direction of the laminated flat electric wire 1 at one end portion (the first end portion or the second end portion), the flat electric wire 2 has, at the other end portion (the second end portion or the first end portion), the tab 3 provided at a position interposed between the tabs 3 of other flat electric wires 2.

Figure 7A:
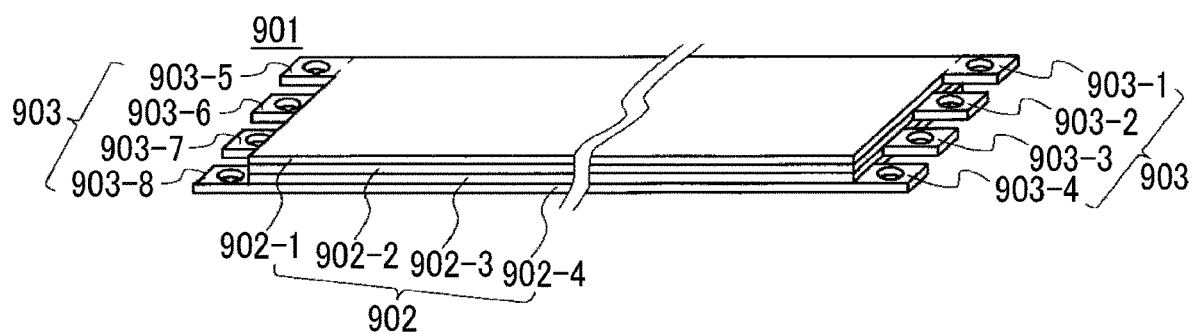
FIG. 7A is a perspective view of a laminated flat wire according to an example of the related art.
Figure 7B:
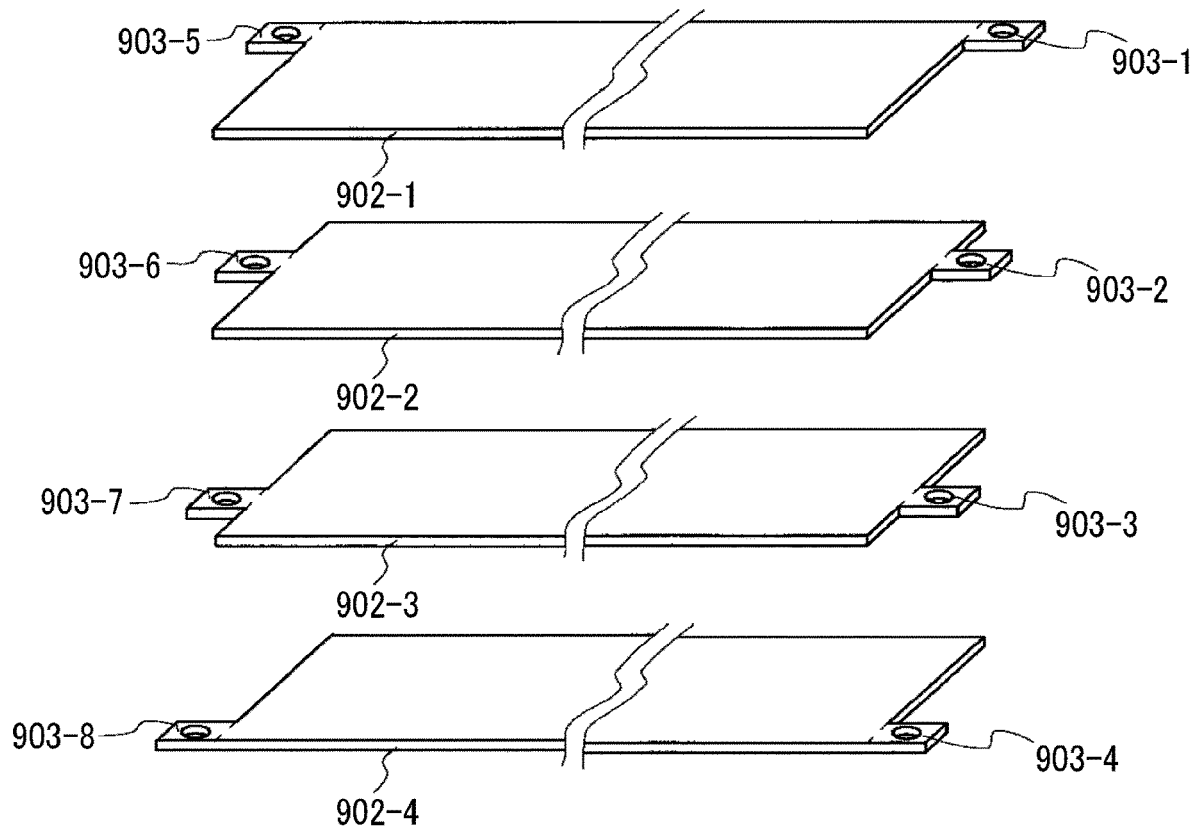
FIG. 7B is an exploded perspective view of the laminated flat wire according to the example of the related art.
Figure 7C:
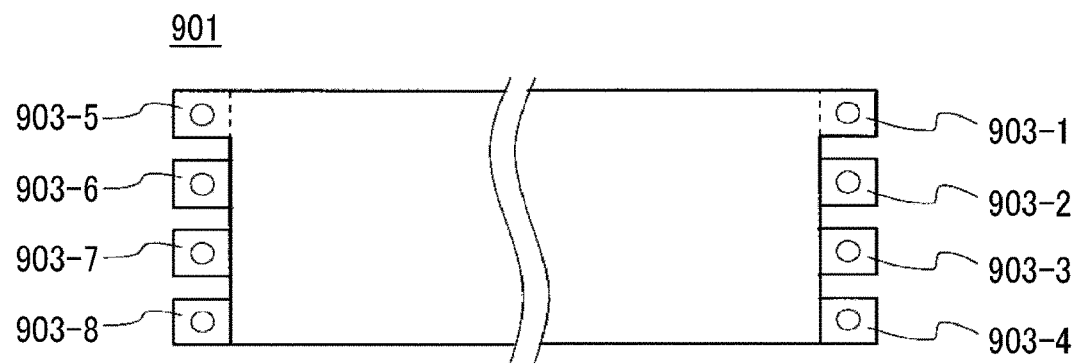
FIG. 7C is a plan view of the laminated flat wire according to the example of the related art.

In this way, variation in electric resistance between the two tabs 3 of each flat electric wire 2 of the laminated flat electric wire 1 can be reduced compared to a case of including a flat electric wire having two tabs 3 provided outermost. Variation in electric resistance between the respective tabs 3 of each of the flat electric wires 2-1 to 2-4 was 0.02 mΩ, and variation in electric resistance between the respective tabs 903 of each of flat electric wires 902-1 to 902-4 which have the same width and the same length as those of the flat electric wire 2, and in which all the lines connecting the tabs 903 are parallel to each other in a longitudinal direction, as shown in FIG. 7A to FIG. 7B, was 0.06 mΩ. As described above, the effect could be confirmed.

In this embodiment, the length of each of the tab 3-1 and the tab 3-5 along the width direction of the flat electric wire 2-1 is set to be less than a quarter of a width W of the flat electric wire 2-1. The tab 3-1 is provided at a corner on the first end portion side, and the tab 3-5 is provided within the range of the distance from a quarter to a half of the width W in the width direction from a corner on the diagonal side of the corner where the tab 3-1 is formed. For example, four flat electric wires 2-1 having planar shapes congruent with each other are prepared in the manner as described above, and the laminated flat electric wire 1 can be configured by using the flat electric wires 2-2, 2-3, 2-4 made by rotating or turning over the three flat electric wires 2-1 of the four flat electric wires. In this way, it is possible to reduce types of parts of the laminated flat electric wire 1 and make it easier to manufacture the flat electric wire 1. Like the flat electric wire 2-1' shown in FIG. 4B, the tab 3-5 may be provided, for example, within the range of the distance from a half to three quarters of the width W in the width direction from the corner on the diagonal side of the corner where the tab 3-1 is formed.

Example 1 of Branch Structure

Figure 5A:
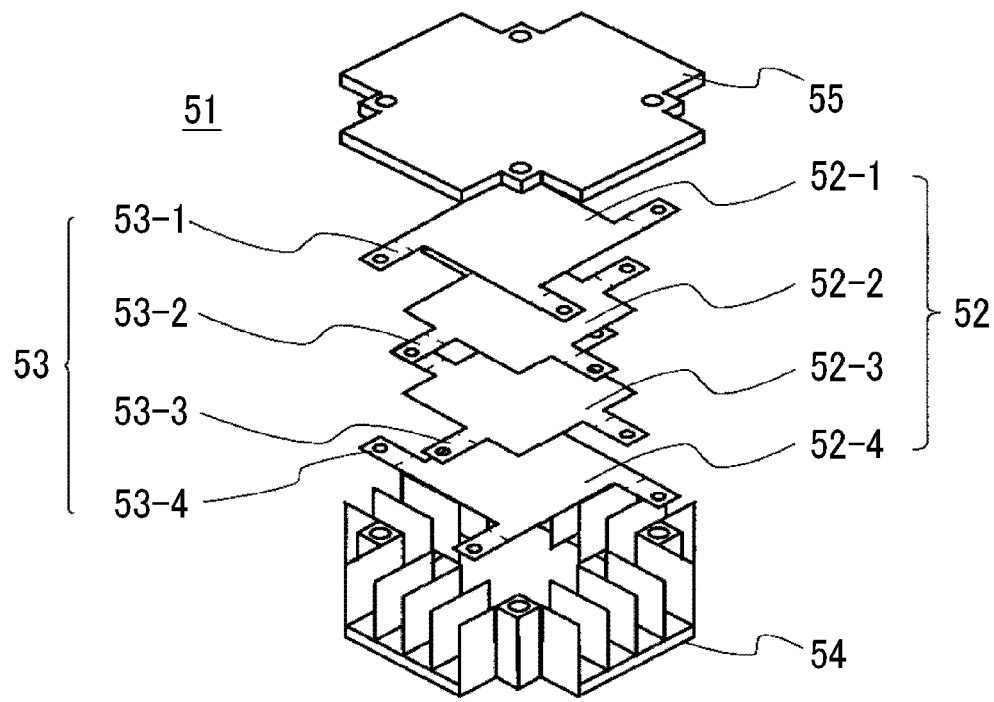
FIG. 5A is an exploded perspective view showing an example of a branch structure of the laminated flat wire according to the embodiment of the disclosure.
Figure 5B:
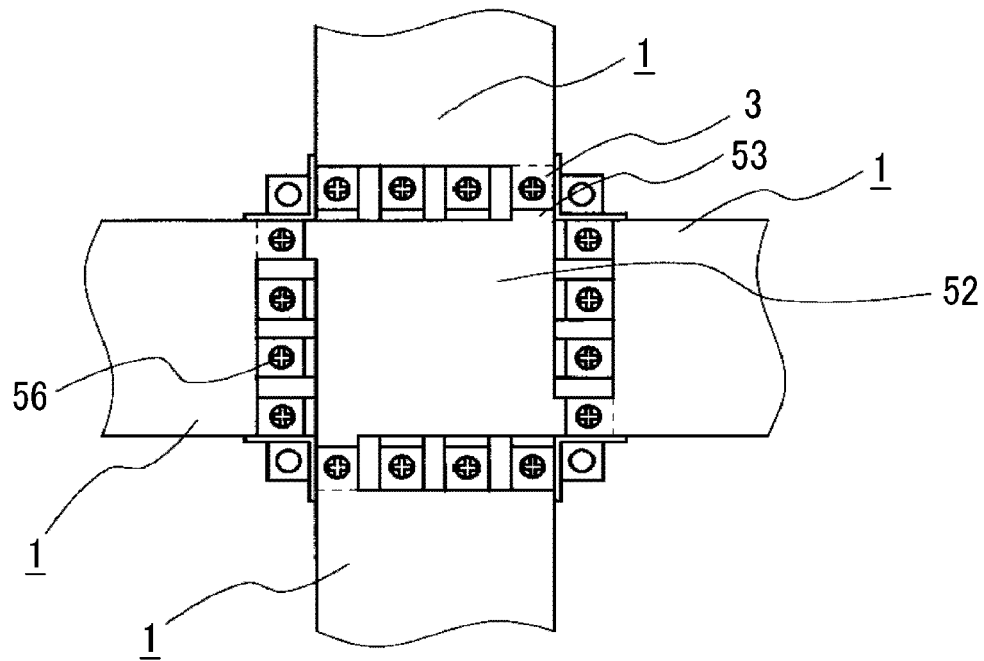
FIG. 5B is a plan view showing an example of the branch structure of the laminated flat wire according to the embodiment of the disclosure.

An example of a branch structure using the laminated flat electric wire 1 as described above and a branch box will be described. FIG. 5A shows an exploded perspective view of a branch box 51 according to a first example. FIG. 5B shows a plan view of a main section in a state where a plurality of laminated flat electric wires 1 is mounted on the branch box 51.

The branch box 51 has four bus bars 52 (52-1 to 52-4) corresponding to the respective flat electric wires 2 between a substrate 54 and a lid 55. The bus bars 52 have insulating layers and are laminated in a state of being insulated from each other. Each of the bus bars 52-1 to 52-4 has a shape in which tabs 53 (53-1 to 53-4) respectively extend from four sides configuring a rectangular shape. Each of the tabs 53 has a hole, as an example, and an insulating layer is not formed on the tab 53.

By preparing a plurality of laminated flat electric wires 1 and fixing the respective tabs 3-1 to 3-4 and the tabs 53-1 to 53-4 of the bus bars 52-1 to 52-4 corresponding to the tabs 3-1 to 3-4 with screws 56 which pass through the respective holes, it is possible to electrically connect the laminated flat electric wires 1 to each other and a branch wire in the extending direction or orthogonal directions.

Example 2 of Branch Structure

Figure 6A:
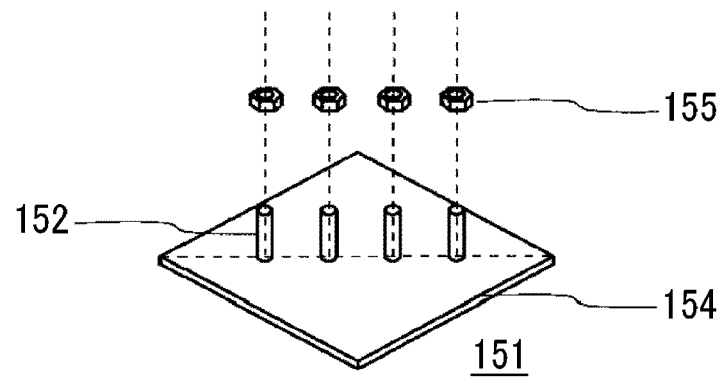
FIG. 6A is an exploded perspective view of a main section showing an example of the branch structure of the laminated flat wire according to the embodiment of the disclosure.
Figure 6B:
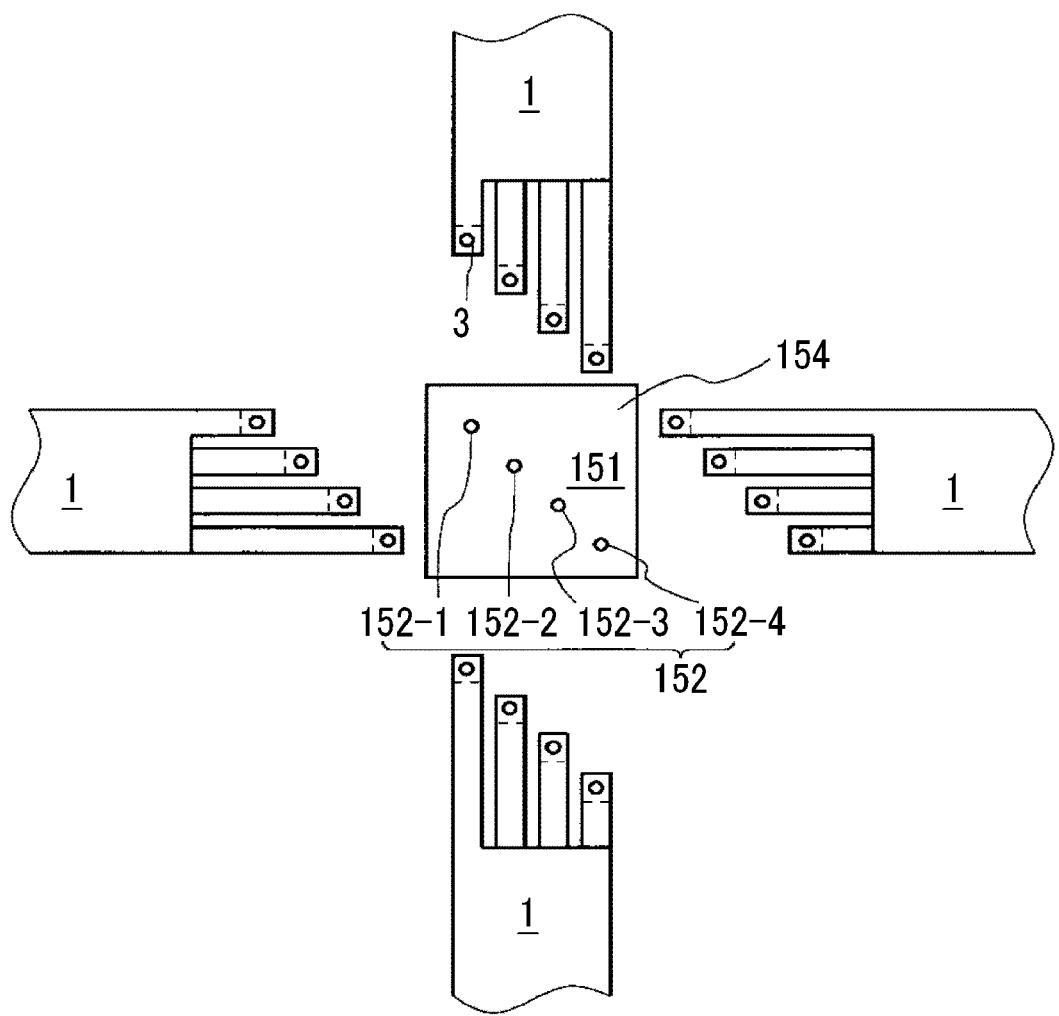
FIG. 6B is a plan view showing an example of the branch structure of the laminated flat wire according to the embodiment of the disclosure.
Figure 6C:
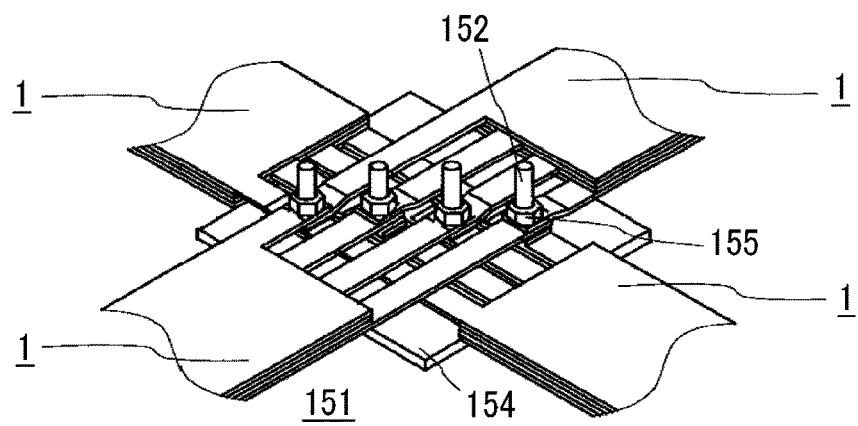
FIG. 6C is a perspective view of the main section showing an example of the branch structure of the laminated flat wire according to the embodiment of the disclosure.

FIG. 6A shows an exploded perspective view of a main section of a branch box 151 according to a second example. FIG. 6B is a plan view showing a mounting direction of the laminated flat electric wires 1 on the branch box 151. FIG. 6C shows a perspective view of the main section in a state where the laminated flat electric wires 1 have been mounted on the branch box 151.

On a substrate 154 of the branch box 151, four bolts 152 (152-1 to 152-4) are provided perpendicularly to the substrate 154.

In the laminated flat electric wire 1, variation in electric resistance between the tabs 3 of the flat electric wire 2 is suppressed as described above, and therefore, even though the extension lengths of the tabs 3 are made different from each other, it is easy to keep variation in electric resistance within an allowable range. For this reason, in this example, the extension lengths of the tabs 3 are made different from each other within an allowable range, and the distances from an end edge of the flat electric wire 2 to the holes of the respective tabs 3 are made different from each other.

In a state where each laminated flat electric wire 1 extends in any direction among four directions as viewed from the branch box 151, by passing each of the bolts 152 through a corresponding hole of the tabs 3 of each laminated flat electric wire 1 and fixing each of the bolts 152 with a nut 155, it is possible to electrically connect the tabs 3 through which the same bolt passes. It is possible to fix the laminated flat electric wires 1 to the branch box 151 and a branch wire to one to three sides. As needed, the tab 3 may be appropriately deformed before it is fixed with the nut 155 or when it is fixed with the nut 155, such that the tabs 3 come in contact with each other and suitably conduct. In the branch structure according to this example, compared to Example 1, the number of fixating locations of the tabs 3 is small, and thus the number of steps for mounting can be reduced, and the number of parts can be reduced, and thus weight and volume can be reduced, which is desirable.

An embodiment of the disclosure has been described above. However, the number of flat electric wires 2, the disposition positions and the disposition order of the tabs 3, and the lamination order of the flat electric wires in the laminated flat electric wire 1 are examples, and as long as it is possible to satisfy the condition of avoiding disposition in which both the two tabs 3 of one flat electric wire 2, among the tabs 3 at both end portions, are provided outermost along the width direction of the laminated flat electric wire 1 in a plan view of the laminated flat electric wire 1, appropriate modifications may be made. As long as the number of flat electric wires 2 that are included in the laminated flat electric wire 1 is 4 or more, the positions of the respective tabs 3 can be set so as to satisfy the above condition. When the flat electric wires having planar shapes congruent with each other are used as at least two of the flat electric wires 2, it is possible to reduce the types of parts and reduce the manufacturing cost.

In the laminated flat electric wire, by interposing an electric power line or a signal line between ground wires provided on an upper layer and a lower layer of the electric power line or the signal line, it is possible to reduce noise in the electric power line or the signal line. When the disclosure is applied to the laminated flat electric wire configured as described above, in addition to a noise reduction, it is possible to suppress variation in electric resistance, to further improve the quality of electric power supply or communication, and to suitably mount the laminated flat electric wire on a vehicle or the like.

Effect

According to the embodiment of the disclosure, it is possible to provide a laminated flat electric wire in which variation in electric resistance is suppressed by avoiding tab disposition in which electric resistance becomes relatively large in a flat electric wire.

The disclosure is useful for electrical wiring in a vehicle or the like.

What is claimed is:

1. A branch structure comprising:
a plurality of laminated flat electric wires, each laminated flat electric wire of the plurality of laminated flat electric wires, comprising:
four or more rectangular plate-shaped flat electric wires, wherein
the flat electric wires are laminated;
each of the flat electric wires includes a first tab at a first end portion and a second tab at a second end portion that are two end portions in an extending direction;
in a plan view as viewed in a direction along a lamination direction of the flat electric wires, the first and second tabs of the respective flat electric wires are provided so as not to overlap each other at each of the first end portion and the second end portion;
in the plan view as viewed in the direction along the lamination direction of the flat electric wires, the first and second tabs of the respective flat wires have different extension lengths from each other; and
a flat electric wire of the flat electric wires having the first tab provided outermost among the first tabs of the flat electric wires along a width direction of the flat electric wires, has, at the second end portion, the second tab provided at a position interposed between the second tabs of at least two of the other flat electric wires; and a branch box including:
a substrate; and
four bolts provided on the substrate and extending perpendicularly to the substrate,
wherein in a state where each laminated flat electric wire of the plurality of laminated flat electric wires extends in any direction among four directions as viewed from the branch box, each of the bolts passes through a corresponding hole of the tabs of each laminated flat electric wire of the plurality of laminated flat electric wires so that the tabs through which the same bolt passes are electrically connected, and the tabs of two laminated flat electric wires of the plurality of laminated flat electric wires through which the same bolt passes have different extension lengths.

2. The branch structure according to claim 1, wherein at least two of the four or more flat electric wires to be laminated have planar shapes congruent with each other.

3. The branch structure according to claim 2, wherein the second tab at the second end portion is provided within a range of a distance from a half to three quarters of a width in the width direction of the flat electric wire from a corner on a diagonal side of a corner where the first tab is formed at the first end portion.

4. The branch structure according to claim 1, wherein the flat electric wires to be laminated have planar shapes congruent with each other.

5. The branch structure according to claim 4, wherein the second tab at the second end portion is provided within a range of a distance from a quarter to a half of a width in the width direction of the flat electric wire from a corner on a diagonal side of a corner where the first tab is formed at the first end portion.

6. The branch structure according to claim 1, wherein the four bolts of the branch box are arranged diagonally on the substrate.

* * * * *